(12) United States Patent
Du et al.

(10) Patent No.: US 9,991,964 B2
(45) Date of Patent: Jun. 5, 2018

(54) HYBRID FREE SPACE MULTIPLEXER FOR MULTICHANNEL TRANSMITTER OPTICAL SUBASSEMBLY

(71) Applicant: FINISAR CORPORATION, Sunnyvale, CA (US)

(72) Inventors: Tengda Du, San Jose, CA (US); Xiaojie Xu, Pleasanton, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 52 days.

(21) Appl. No.: 15/067,000

(22) Filed: Mar. 10, 2016

(65) Prior Publication Data

US 2016/0269808 A1    Sep. 15, 2016

Related U.S. Application Data

(60) Provisional application No. 62/131,028, filed on Mar. 10, 2015.

(51) Int. Cl.
*H04B 10/12* (2006.01)
*H04B 10/50* (2013.01)
*H04J 14/06* (2006.01)

(52) U.S. Cl.
CPC ......... *H04B 10/503* (2013.01); *H04B 10/506* (2013.01); *H04J 14/06* (2013.01)

(58) Field of Classification Search
None
See application file for complete search history.

(56) References Cited

U.S. PATENT DOCUMENTS

| | | | |
|---|---|---|---|
| 2008/0049584 A1* | 2/2008 | Tan | G02B 5/305 369/112.16 |
| 2012/0133946 A1* | 5/2012 | Eckman | G02B 21/0004 356/450 |
| 2015/0318951 A1* | 11/2015 | Zhang | G02B 27/28 398/65 |
| 2016/0131843 A1* | 5/2016 | Amit | G02B 6/4221 385/24 |

* cited by examiner

*Primary Examiner* — Ken N Vanderpuye
*Assistant Examiner* — David Lambert
(74) *Attorney, Agent, or Firm* — Maschoff Brennan

(57) ABSTRACT

Embodiments described herein include a multichannel transmitter optical subassembly that includes a plurality of lasers and a signal combiner. The plurality of lasers may be configured to emit light each with a different one of a plurality of light signals, each of the plurality of light signals having a wavelength within one of a plurality of wavelength bands. The signal combiner may be disposed relative to the plurality of lasers to receive the plurality of light signals. The signal combiner may include at least one surface having an optical coating that reflects at least one of the light signals of the plurality of light signals and transmits at least one of the light signals of the plurality of light signals.

20 Claims, 7 Drawing Sheets

HYBRID FREE SPACE MULTIPLEXER FOR MULTICHANNEL TRANSMITTER OPTICAL SUBASSEMBLY

CROSS-REFERENCE TO RELATED APPLICATIONS

This application claims the benefit of U.S. Provisional Patent Application No. 62/131,028, filed Mar. 10, 2015, titled HYBRID FREE SPACE MULTIPLEXER FOR MULTICHANNEL TRANSMITTER OPTICAL SUBASSEMBLY, which is incorporated herein by reference in its entirety.

FIELD

This disclosure generally relates to hybrid free space multiplexers for multichannel transmitter optical assemblies.

BACKGROUND

Communication modules, such as electronic or optoelectronic transceivers or transponder modules, are increasingly used in electronic and optoelectronic communication. Communication modules communicate with a host device printed circuit board (PCB) by transmitting and/or receiving electrical data signals to and/or from the host device PCB. The electrical data signals can also be transmitted by the communication module outside a host device as optical and/or electrical data signals. Many communication modules include optical subassemblies (OSAs) such as transmitter optical subassemblies (TOSAs) and/or receiver optical subassemblies (ROSAs) to convert between the electrical and optical domains.

Generally, a ROSA transforms an optical signal received from an optical fiber or another source to an electrical signal that is provided to the host device. A photodiode or similar optical receiver included in the ROSA transforms the optical signal to the electrical signal. A TOSA transforms an electrical signal received from the host device to an optical signal that is transmitted onto an optical fiber or other transmission medium. A laser diode or similar optical transmitter included in the TOSA is driven to emit the optical signal representing the electrical signal received from the host device.

A common configuration for OSAs includes a transistor outline ("TO") package such as a TO can. An example TO can is generally a self-contained and often hermetically sealed canister with one or more optical components disposed within the canister. Specifically, TO cans may incorporate one or more optical components such as an optical transmitter or an optical receiver. The TO can may be configured to fit within a cavity defined in an optical port opposite a second cavity configured to receive an optical fiber. The optical port enables the optical component(s) disposed within the TO can to communicate via the optical fiber. The TO can may further include electrical contacts that allow the optical component(s) to communicate with a host device electrically coupled to the OSA.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Embodiments described herein include a multichannel transmitter optical subassembly that includes a plurality of lasers and a signal combiner. The plurality of lasers may emit light each with a different one of a plurality of light signals, each of the plurality of light signals having a wavelength within one of a plurality of wavelength bands. The signal combiner may be disposed relative to the plurality of lasers to receive the plurality of light signals. The signal combiner may include at least one surface having an optical coating that reflects at least one of the light signals of the plurality of light signals and transmits at least one of the light signals of the plurality of light signals.

BRIEF DESCRIPTION OF THE FIGURES

These and other features, aspects, and advantages of the present disclosure are better understood when the following Detailed Description is read with reference to the accompanying drawings.

DETAILED DESCRIPTION

Aspects of this disclosure relate to a hybrid free space multiplexer for a multichannel transmitter optical subassembly (TOSA).

Communication modules, such as electronic or optoelectronic transceivers or transponder modules, are increasingly used in electronic and optoelectronic communication. Communication modules communicate with a host device printed circuit board (PCB) by transmitting and/or receiving electrical data signals to and/or from the host device PCB. The electrical data signals can also be transmitted by the communication module outside a host device as optical and/or electrical data signals. Many communication modules include optical subassemblies (OSAs) such as transmitter optical subassemblies (TOSAs) and/or receiver optical subassemblies (ROSAs) to convert between the electrical and optical domains.

Generally, a ROSA transforms an optical signal received from an optical fiber or another source to an electrical signal that is provided to the host device. A photodiode or similar optical receiver included in the ROSA transforms the optical signal to the electrical signal. A TOSA transforms an electrical signal received from the host device to an optical signal that is transmitted onto an optical fiber or other transmission medium. A laser diode or similar optical transmitter included in the TOSA is driven to emit an optical signal representing the electrical signal received from the host device. In some embodiments, a high speed single mode edge-emitting laser diode can be used that may, for example, emit linearly polarized light.

Figure 1:
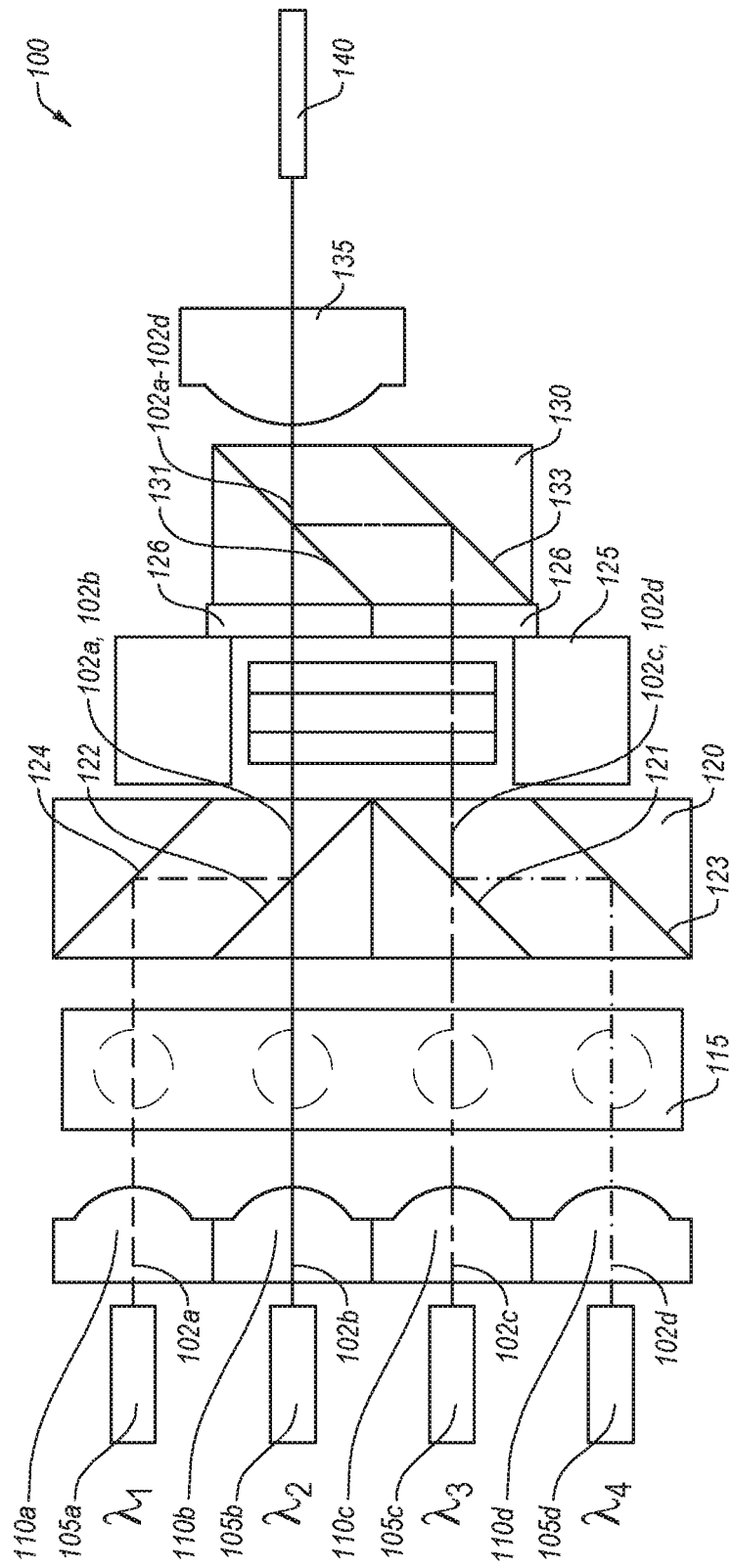
FIG. 1 illustrates an example multichannel transmitter optical subassembly with a beam combiner.

FIG. 1 illustrates an example multichannel TOSA 100 with a beam combiner according to some embodiments described herein. The multichannel TOSA 100 includes, for example, a plurality of lasers 105a-105d each emitting light signals 102a-102d. The light signals 102a-102d emitted from the lasers 105a-105d may each include a wavelength $\lambda_1, \lambda_2, \lambda_3, \lambda_4$. In particular, the light signal 102a may include the wavelength $\lambda_1$, which in some embodiments includes a spectral profile of the light signal 102a being centered at the wavelength $\lambda_1$. Similarly, the light signal 102b may include the wavelength $\lambda_2$, the light signal 102c may include the wavelength $\lambda_3$, and the light signal 102d may include the wavelength $\lambda_4$. The light signals 102a-102d may be focused or collimated by a plurality of lenses 110a-110d toward a beam splitter 115. For example, the beam splitter 115 may be a 95/5 beam splitter that may be optically coupled to at least one monitor photodiode (MPD), or one MPD corresponding to each of the lasers 105a-105d. In some embodiments, a 95/5 beam splitter is a beam splitter that passes through about 95% of each light signal 102a-102d and redirects about 5% of each light signal 102a-102d to one or more corresponding MPDs.

The light signals 102a-102d may then be transmitted to a low/high pass beam combiner 120. The low/high pass beam combiner 120 may be configured to combine the light signals 102a-102d travelling therethrough onto one or more common optical paths. For example, as illustrated, the low/high pass beam combiner 120 is configured to combine the light signal 102a with the light signal 102b on a common optical path and is configured to combine the light signal 102c with the light signal 102d on another common optical path.

As illustrated, the low/high pass beam combiner 120 may include one or more surfaces 121 and 122 with an optical coating that reflects light in one wavelength band and transmits light in another wavelength band. The surface 121 and/or the surface 122 may be angled surfaces. For example, the surface 121 may be angled at 45 degrees relative to the path of the light signal 102c and/or the light signal 102d. In another example, the surface 122 may be angled at 45 degrees relative to the path of the light signal 102a and/or the light signal 102b.

The optical coating on the surface 121 may transmit light having a wavelength that is within a wavelength band that includes the wavelength $\lambda_3$ of the light signal 102c produced by the third laser 105c and may reflect light having a wavelength that is within a wavelength band that includes the wavelength $\lambda_4$ of the light signal 102d produced by the fourth laser 105d. Additionally or alternatively, the optical coating on the surface 122 may transmit light having a wavelength that is within a wavelength band that includes the wavelength $\lambda_2$ of the light signal 102b produced by the second laser 105b and may reflect light having a wavelength that is within a wavelength band that includes the wavelength $\lambda_1$ of the light signal 102a produced by the first laser 105a.

Because the surface 121 includes a surface optical coating that transmits light with a wavelength within a wavelength band that includes the wavelength $\lambda_3$ of the light signal 102c from the third laser 105c, the light signal 102c from the third laser 105c may pass through the surface 121. The light signal 102d from the fourth laser 105d may be reflected from the transmission path of the light signal 102d by a surface 123. The surface 123 may be disposed at a forty-five degree angle relative to the transmission path of the light signal 102d from the fourth laser 105d. Alternatively or additionally, the surface 122 and the surface 123 may be arranged at any angle relative to the transmission path and/or may be parallel relative to one another. The light signal 102d from the fourth laser 105d may then be reflected by the surface 121 and/or in a direction parallel to the path of the light signal 102c from the third laser 105c, and/or parallel to the original path of the light signal 102d when it is emitted from the fourth laser 105d. In this way, for example, the low/high pass beam combiner 120 may combine the light signal 102c emitted from the laser 105c and the light signal 102d emitted from the laser 105d.

Similarly, because the surface 122 includes a surface optical coating that transmits light with a wavelength within a wavelength band that includes the wavelength $\lambda_2$ of the light signal 102b from the second laser 105b, the light signal 102b from the second laser 105b may pass through the surface 122. The light signal 102a from the first laser 105a may be reflected from the transmission path of the light signal 102a by a surface 124. The surface 124 may be disposed at a forty-five degree angle relative to the transmission path of the light signal 102a from the first laser 105a. Alternatively or additionally, the surface 122 and the surface 124 may be arranged at any angle relative to the transmission path and/or may be parallel relative to one another. The light signal 102a from the first laser 105a may then be reflected by the surface 122 and/or in a direction parallel to the path of the light signal 102b from the second laser 105b, and/or parallel to the original path of the light signal 102a when it is emitted from the first laser 105a. In this way, for example, the low/high pass beam combiner 120 may combine the light signal 102b emitted from the laser 105b and the light signal 102a emitted from the laser 105a.

In some configurations, the light signals 102a-102d emitted by the lasers 105a-105d may each have the same linear polarization. For example, the light signals 102a-102d emitted from the lasers 105a-105d may include a horizontal and/or 0 degree polarization. The light signals 102a-102d may pass through the beam splitter 115 and the low/high pass beam combiner 120 retaining the horizontal or 0 degree polarization.

The light signals 102a-102d may then pass through one or more of an isolator 125, a waveplate 126, a polarization beam combiner 130 and/or one or more lens 135 prior to being output to an optical fiber 140 for transmission via an optical communication network.

In some configurations, the isolator 125 may include a single stage isolator that may rotate the polarization of light travelling therethrough, for example, to a 45 degree polarization. Thus, the light signals 102a-102d may leave the isolator 125 with the 45 degree polarization and travel to the waveplate 126.

In some embodiments, the waveplate 126 may include a half waveplate configured to rotate the polarization of light passing therethrough. For example, the waveplate 126 may rotate the 45 degree polarization of the light signals 102a-102d to vertical and/or horizontal polarizations. The waveplate 126 may include two portions, including a first portion in the optical path of the light signals 102a, 102b and a second portion in the optical path of the light signals 102c, 102d. The first portion and the second portion of the waveplate 126 may be configured to rotate polarization of the light signals 102a, 102b and of the light signals 102c, 102d to polarizations that are orthogonal to one another. For example, the first portion in the optical path of the light signals 102a, 102b may be configured to rotate polarization of each of the light signals 102a, 102b to a vertical and/or 90 degree polarization, and the second portion in the optical path of the light signals 102c, 102d may be configured to rotate polarization of each of the light signals 102c, 102d to a horizontal and/or 0 degree polarization, or vice versa.

In these and other embodiments, the first portion of the waveplate 126 may be oriented at about −22.5 degrees, and the second portion of the waveplate 126 may be oriented at about 22.5 degrees. As used herein, the term "oriented at" as applied to a waveplate refers to the orientation of the optical axis angle of a waveplate crystal with respect to a signal passing therethrough.

The polarization beam combiner 130 may combine light having different polarizations onto a common optical path. In some configurations, the polarization beam combiner 130 may combine optical signals having orthogonal polarizations with respect to one another, such as the light signals 102a, 102b and the light signals 102c, 102d that have travelled through the waveplate 126. As illustrated, the polarization beam combiner 130 is configured to combine the light signals 102a, 102b with the light signals 102c, 102d to output the light signals 102a-102d on a common optical path that passes through the lens 135 to the optical fiber 140.

In more detail, and as illustrated, the polarization beam combiner 130 may include a surface 131 with an optical coating that reflects light with a first polarization and transmits light with a second polarization that is orthogonal to the first polarization. The surface 131 may be an angled surface. For example, the surface 131 may be angled at 45 degrees relative to the path of the light signals 102a, 102b and/or the light signals 102c, 102d.

The optical coating on the surface 131 may transmit light having vertical polarization, such as the light signals 102a, 102b that have travelled through the waveplate 126. The optical coating on the surface 131 may reflect light having horizontal polarization, such as the light signals 102c, 102d that have travelled through the waveplate 126.

Because the light signals 102a, 102b have vertical polarization, and because the surface 131 includes the surface optical coating that transmits light with vertical polarization, the light signals 102a, 102b may pass through the surface 131. The light signals 102c, 102d may be reflected from the transmission path of the light signals 102c, 102d by a surface 133. The surface 133 may be disposed at a forty-five degree angle relative to the transmission path of the light signals 102c, 102d. Alternatively or additionally, the surface 131 and the surface 133 may be arranged at any angle relative to the transmission path and/or may be parallel relative to one another. Because the light signals 102c, 102d have horizontal polarization after passing through the waveplate 126, and because the surface 131 includes the surface optical coating that reflects light with horizontal polarization, the light signals 102c, 102d may then be reflected by the surface 131 in a direction parallel to the path of the light signals 102a, 102b, and/or parallel to the original path of the light signals 102c, 102d. In this way, for example, the polarization beam combiner 130 may combine the light signals 102a, 102b and the light signals 102c, 102d onto a common optical path.

In other configurations, the optical coating on the surface 131 may reflect light having vertical polarization and transmit light having horizontal polarization. In such configurations, the waveplate 126 may be configured to polarize the light signals 102a, 102b to horizontal polarization and polarize the light signals 102c, 102d to vertical polarization.

Figure 2:
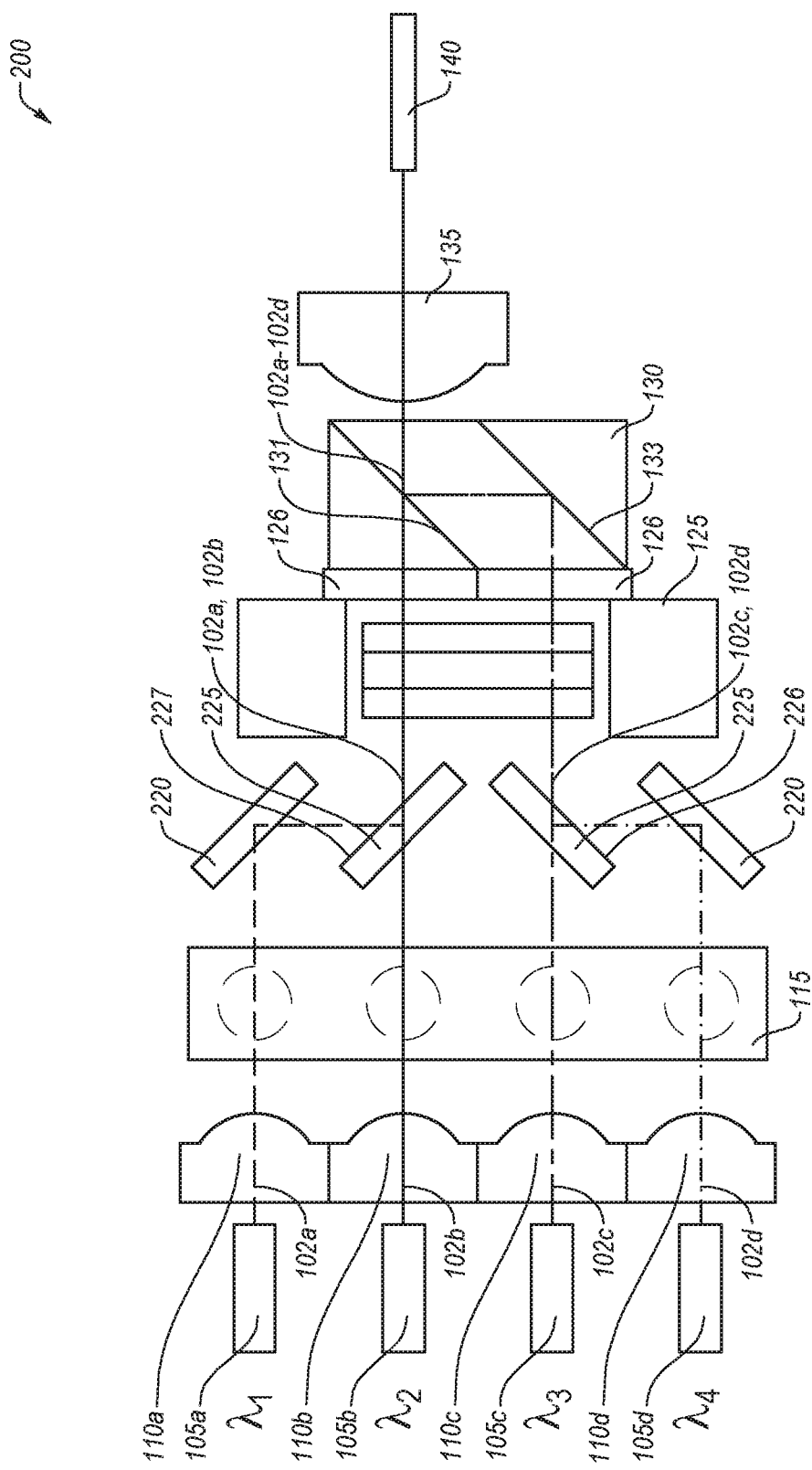
FIG. 2 illustrates another example of a multichannel transmitter optical subassembly with filters and mirrors.

FIG. 2 illustrates another example of a multichannel TOSA 200 with filters 225 and mirrors 220 according to some embodiments described herein. As illustrated, the TOSA 200 may include at least some components that are similar to or the same as those described with respect to the TOSA 100. Such components are indicated with the same component numbering as used in FIG. 1 to describe the TOSA 100. As illustrated, the filters 225 and the mirrors 220 may be implemented in the TOSA 200 rather than the low/high pass beam combiner 120 of the TOSA 100.

The filters 225 may include surfaces 226 and 227 that include optical coatings that reflect light in one wavelength band and transmit light in another wavelength band. Each of the mirrors 220 is disposed within a corresponding one of the optical paths of the light signals 102a and 102d. For example, the mirrors 220 may be disposed at 45 degree angles with respect to the original optical paths of the light signals 102a and 102d. Additionally or alternatively, each of the filters 225 may be disposed within a corresponding one of the optical paths of the light signals 102b and 102c. For example, the filters 225 may be disposed at 45 degree angles with respect to the original optical paths of the light signals 102b and/or 102c.

The optical coating on the surface 226 may transmit light having a wavelength that is within a wavelength band that includes the wavelength $\lambda_3$ of the light signal 102c produced by the third laser 105c and may reflect light having a wavelength that is within a wavelength band that includes the wavelength $\lambda_4$ of the light signal 102d produced by the fourth laser 105d. And, the optical coating on the surface 227 may transmit light having a wavelength that is within a wavelength band that includes the wavelength $\lambda_2$ of the light signal 102b produced by the second laser 105b and may reflect light having a wavelength that is within a wavelength band that includes the wavelength $\lambda_1$ of the light signal 102a produced by the first laser 105a.

Because the surface 226 includes a surface optical coating that transmits light with a wavelength within a wavelength band that includes the wavelength $\lambda_3$ of the light signal 102c produced by the third laser 105c, the light signal 102c from the third laser 105c may pass through the surface 226. The light signal 102d from the fourth laser 105d may be reflected from the transmission path of the light signal 102d by the mirror 220. In some embodiments, the mirror 220 may be disposed at a forty-five degree angle relative to the transmission path of the light signal 102d from the fourth laser 105d. Alternatively or additionally, the mirror 220 and the surface 226 may be parallel. The light signal 102d from the fourth laser 105d may then be reflected by the surface 226 and/or in a direction parallel to the path of the light signal 102c from the third laser 105c, and/or parallel to the original path of the light signal 102d when it is emitted from the fourth laser 105d. In this way, for example, the filters 225 and the mirrors 220 may combine the light signals 102c, 102d emitted from the lasers 105c and 105d onto a common optical path.

Similarly, because the surface 227 includes a surface optical coating that transmits light with a wavelength within a wavelength band that includes the wavelength $\lambda_2$ of the light signal 102b from the second laser 105b, the light signal 102b from the second laser 105b may pass through the surface 227. The light signal 102a from the first laser 105a may be reflected from the transmission path of the light signal 102a by the mirror 220. The mirror 220 may be disposed at a forty-five degree angle relative to the transmission path of the light signal 102a from the first laser 105a. Alternatively or additionally, the mirror 220 and the surface 226 may be parallel. The light signal 102a from the first laser 105a may then be reflected by the surface 227, and/or in a direction parallel to the path of the light signal 102b from the second laser 105b, and/or parallel to the original path of the light signal 102a when it is emitted from the first laser 105a. In this way, for example, the filters 225 and the mirrors 220 may combine the light signals 102a and 102b emitted from the lasers 105a and 105b onto a common optical path.

During operation, the multichannel TOSA 100 and/or 200 can receive one or more data-carrying electrical signals from an electrical device for transmission as one or more data-carrying optical signals (e.g., light signals 102a-102d) through the optical fiber 140. The electrical device may include any computing system or electrical system capable of electrically communicating with the multichannel TOSA. The electrical signal(s) can be provided to the lasers 105a-105d. The lasers 105a-105d may then convert the electrical signal(s) into the data-carrying optical signal(s) that is then transmitted through the various optical components shown in FIG. 1, FIG. 2 and/or additional components.

Each laser, for example, may transmit light at a different wavelength (e.g., $\lambda_1$, $\lambda_2$, $\lambda_3$, and $\lambda_4$) nominally equivalent to a center wavelength defined by a standard. The nominal center wavelengths, for example, may be defined in international standards such as IEEE and ITU. In some embodiments, the actual center wavelength of each light signal emitted by the lasers may deviate from the nominal center wavelength within the passband (e.g., +/−6.5 nm for CWDM). In some embodiments, each nominal center wavelength may be separated from the adjacent ones by 20 nm for CWDM. In some embodiments the difference between the first center wavelength $\lambda_1$ of the light signal 102a that is produced by the first laser 105a and the second center wavelength $\lambda_2$ of the light signal 102b that is produced by the second laser 105b may be equal to 40 nanometers: $|\lambda_1-\lambda_2|\geq 40$ nm. In some embodiments the difference between the third center wavelength $\lambda_3$ of the light signal 102c that is produced by the third laser 105c and the fourth center wavelength $\lambda_4$ of the light signal 102d that is produced by the fourth laser 105d may be equal to 40 nanometers: $|\lambda_3-\lambda_4|\geq 40$ nm.

In some embodiments, the wavelength $\lambda_3$ of the light signal 102c produced by the third laser 105c may be 1291 nm: $\lambda_3=1291$ nm. In some embodiments, the wavelength $\lambda_2$ of the light signal 102b produced by the second laser 105b may be 1291 nm: $\lambda_2=1291$ nm. In some embodiments, the wavelength $\lambda_4$ of the light signal 102b produced by the fourth laser 105d may be 1331 nm: $\lambda_4=1331$ nm. In some embodiments, the wavelength $\lambda_1$ of the light signal 102a produced by the first laser 105a may be 1331 nm: $\lambda_1=1331$ nm.

In some embodiments, the center wavelengths transmitted may be defined as LAN-WDM. The channel spacing, for example, may be 800 GHz in light frequency or approximately 4.5 nm in wavelength. In some embodiments, each actual center wavelength could be deviated from the nominal center wavelength within the passband (i.e. +/−1.03~1.05 nm). In some embodiments the difference between the first center wavelength $\lambda_1$ of the light signal 102a which is produced by the first laser 105a, and the second center wavelength $\lambda_2$ of the light signal 102b which is produced by the second laser 105b, may be greater than or equal to twice of channel spacing: $|\lambda_1-\lambda_2|\sim 9$ nm. In some embodiments, the difference between the third center wavelength $\lambda_3$ of the light signal 102c which is produced by the third laser 105c, and the fourth center wavelength $\lambda_4$ of the light signal 102d which is produced by the fourth laser 105d, may be greater than or equal to twice of channel spacing: $|\lambda_3-\lambda_4|\sim 9$ nm.

In some embodiments, the wavelength $\lambda_3$ of the light signal 102c produced by the third laser 105c may be 1300.05 nm: $\lambda_3=1300.05$. In some embodiments, the wavelength $\lambda_2$ of the light signal 102b produced by the second laser 105b may be 1295.56 nm: $\lambda_2=1295.56$ nm. In some embodiments, the wavelength $\lambda_4$ of the light signal 102d produced by the fourth laser 105d may be 1309.14 nm: $\lambda_4=1309.14$ nm. In some embodiments, the wavelength $\lambda_1$ of the light signal 102a produced by the first laser 105a may be 1304.58 nm: $\lambda_1=1304.58$ nm.

A first optical coating may be applied to the surface 121 of FIG. 1, for example, to reflect light within a wavelength band around or near the first wavelength $\lambda_1$ and transmit light within a wavelength band around the second wavelength $\lambda_2$. A second optical coating may be applied to the surface 122 of FIG. 1, for example, to reflect light within a wavelength band around or near the fourth wavelength $\lambda_4$ and transmit light within a wavelength band around the third wavelength, $\lambda_3$.

In some embodiments, the wavelength arrangement of the various lasers 105a-105d may vary depending on the type of optical coating or optical coatings applied to the surfaces or other portions of the beam combiner and/or the filters and mirrors. Similarly, in some embodiments, the type of optical coating may be selected based on the wavelengths of the various lasers 105a-105d.

Figure 3:
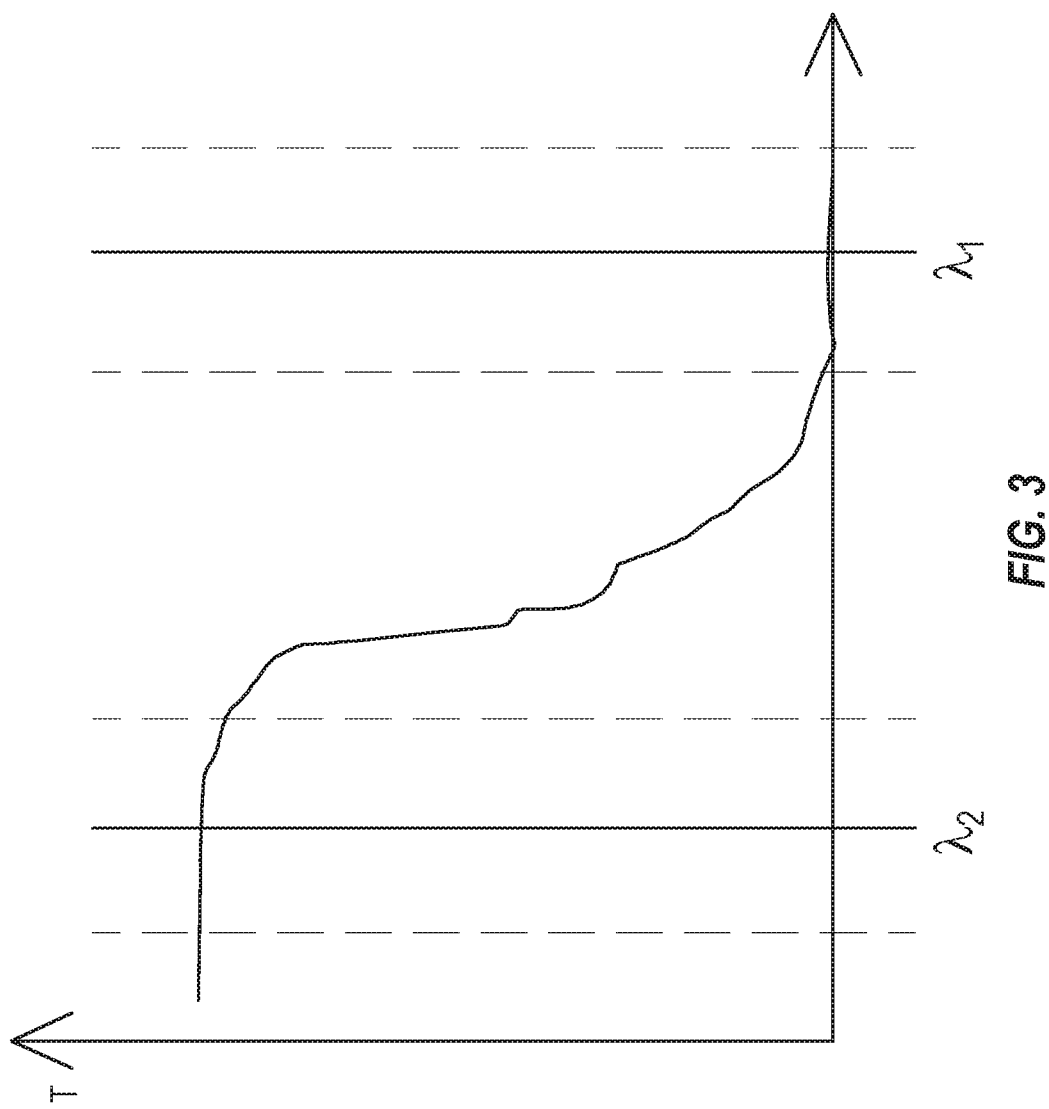
FIG. 3 illustrates a graph of transmittance of light versus wavelength for an optical coating.

FIG. 3 illustrates a graph of transmittance T of light versus wavelength for an optical coating according to some embodiments described herein. As illustrated, the optical coating transmits substantially all or most of the light within a band around wavelength $\lambda_2$ and substantially reflects all or most of the light within a band around wavelength $\lambda_1$. The optical coating may also transmit substantially all or most of the light within a band around wavelength $\lambda_3$ and substantially reflect all or most of the light within a band around wavelength $\lambda_4$. The optical coating may be applied to surface 122 and/or surface 121 of the TOSA 100 of FIG. 1. Additionally or alternatively, the optical coating may be applied to the surface 226 and/or the surface 227 of the TOSA 200 of FIG. 2. In other configurations, the optical coating may be applied to other optical components described herein. The optical coating may include any type of coating that acts as a high pass filter or a low pass filter. Alternatively, the coating may include any type of coating that acts as a bandpass filter.

Figure 4:
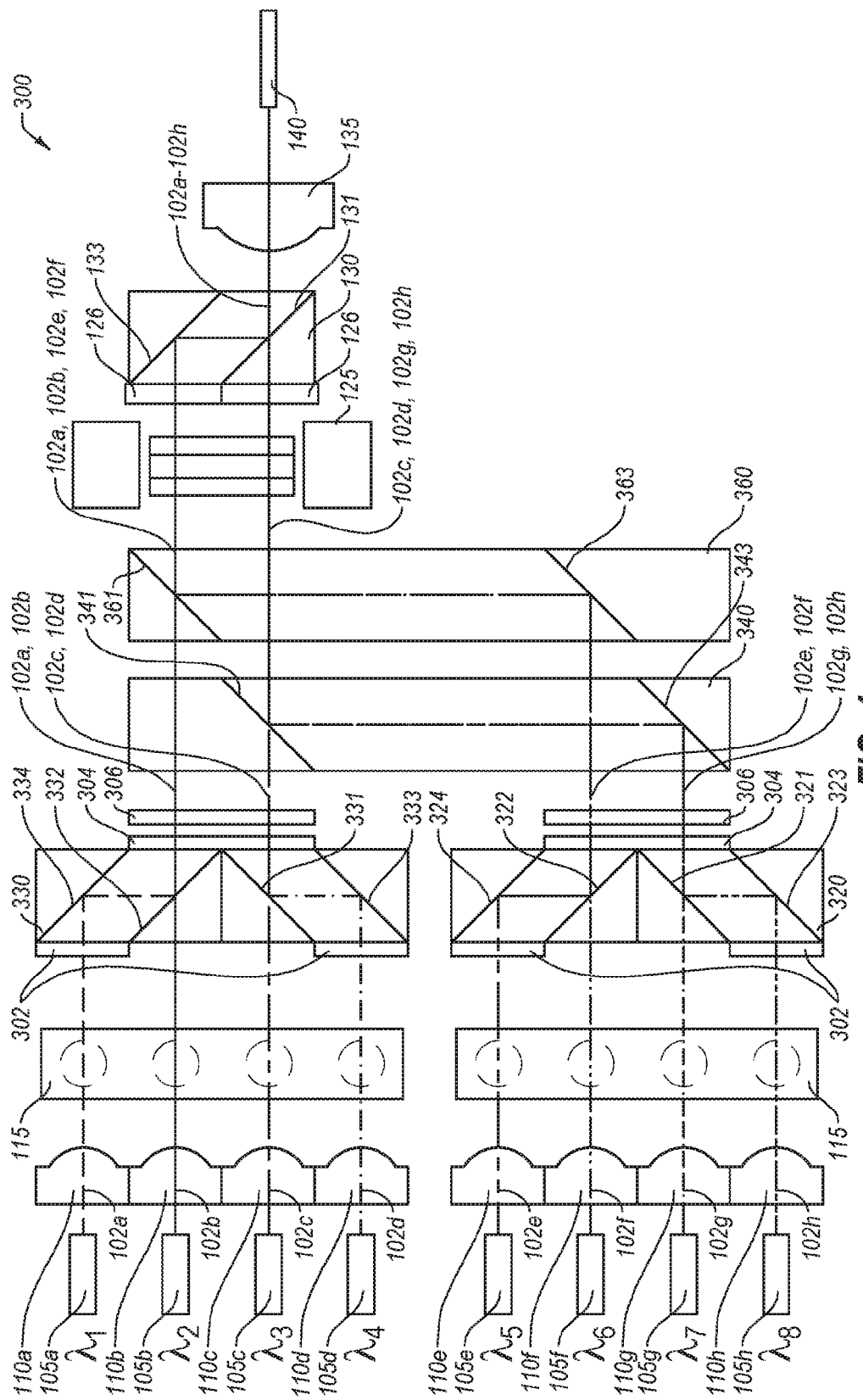
FIG. 4 illustrates another example of a multichannel transmitter optical subassembly.

FIG. 4 illustrates another example of a multichannel TOSA 300 according to some embodiments described herein. As illustrated, the TOSA 300 may include components similar or the same as those described with respect to the TOSA 100 and the TOSA 200. Such components are indicated with the same component numbering as used to describe the TOSA 100 and the TOSA 200. Rather than including four (4) of the lasers 105a-105d as illustrated with respect to the TOSA 100 and the TOSA 200, the TOSA 300 may include eight (8) lasers 105a-105h. Whereas the TOSA 100 and the TOSA 200 may be considered four (4) channel TOSAs, the TOSA 300 may be considered an eight (8) channel TOSA.

Each of the lasers 105a-105h may emit corresponding light signals 102a-102h. The light signals 102a-102h emitted from the lasers 105a-105h may each include a wavelength $\lambda_1$, $\lambda_2$, $\lambda_3$, $\lambda_4$, $\lambda_5$, $\lambda_6$, $\lambda_7$, $\lambda_8$. The light signal 102e may include the wavelength $\lambda_5$, which in some embodiments includes a spectral profile of the light signal 102e being centered at the wavelength $\lambda_5$. Similarly, the light signal 102f may include the wavelength $\lambda_6$, the light signal 102g may include the wavelength $\lambda_7$, and the light signal 102h may include the wavelength $\lambda_8$. The TOSA 300 may include a corresponding number of the lenses 110a-110h that may focus or collimate the light signals 102a-102h emitted from the lasers 105a-105h.

The TOSA may include two beam splitters 115, each of the beam splitters 115 may be optically coupled to four of the lasers 105a-105h. For example, as illustrated, one of the beam splitters 115 is optically coupled to the lasers 105a-105d and another one of the beam splitters 115 is optically coupled to the lasers 105e-105h. Additionally or alternatively, the beam splitters 115 may be optically coupled to at least one monitor photodiode (MPD), or one MPD corresponding to each of the lasers 105a-105h. In other configurations, the TOSA 300 may include any suitable number of beam splitters. For example, a single beam splitter may be optically coupled to each of the lasers 105a-105h.

As illustrated, TOSA 300 includes a first polarization beam combiner 320 and a second polarization beam combiner 330. The polarization beam combiner 320 and/or the polarization beam combiner 330 may include any suitable aspects described with respect to the polarization beam combiner 130. The light signals 102a-102d may travel through the corresponding lenses 110a-110d, the corresponding beam splitter 115, and the polarization beam combiner 330. The light signals 102e-102h may travel through the corresponding lenses 110e-110h, the corresponding beam splitter 115, and the polarization beam combiner 320.

In some configurations, the light signals 102a-102h emitted by the lasers 105a-105h may each have the same linear polarization. For example, the light signals 102a-102h emitted from the lasers 105a-105h may include a horizontal and/or 0 degree polarization. The light signals 102a-102h may pass through the beam splitters 115 retaining the horizontal or 0 degree polarization.

As illustrated, the light signals 102a and 102d may pass through waveplates 302 prior to passing into the polarization beam combiner 330. Similarly, the light signals 102e and 102h may pass through waveplates 302 prior to passing into the polarization beam combiner 320. In some embodiments, one or more of the waveplates 302 may include half waveplates configured to rotate the polarization of light passing therethrough. For example, the waveplates 302 may be configured to rotate the horizontal polarization of the light signals 102a, 102d, 102e, and 102h to vertical polarization. Thus, the waveplates 302 may rotate the polarization of the light signals 102a, 102d, 102e, and 102h to vertical polarization that is orthogonal to the horizontal polarization of the light signals 102b, 102c, 102f, and 102g.

The polarization beam combiner 330 may combine light having different polarizations onto a common optical path. In some configurations, the polarization beam combiner 330 may combine optical signals having orthogonal polarizations with respect to one another, such as the light signals 102a, 102b and the light signals 102c, 102d. As illustrated, the polarization beam combiner 330 is configured to combine the light signals 102a, 102b to output the light signals 102a, 102b on a common optical path. Further, the polarization beam combiner 330 is configured to combine the light signals 102c, 102d to output the light signals 102c, 102d on a common optical path.

In more detail, and as illustrated, the polarization beam combiner 330 may include a surface 331 with an optical coating that reflects light with a first polarization and transmits light with a second polarization that is orthogonal to the first polarization. The surface 331 may be an angled surface. For example, the surface 331 may be angled at 45 degrees relative to the path of the light signals 102c, 102d. The optical coating on the surface 331 may transmit light having horizontal polarization, such as the light signal 102c. The optical coating on the surface 331 may reflect light having vertical polarization, such as the light signal 102d that has travelled through the waveplate 302.

Additionally or alternatively, the polarization beam combiner 330 may include a surface 332 with an optical coating that reflects light with a first polarization and transmits light with a second polarization that is orthogonal to the first polarization. The surface 332 may be an angled surface. For example, the surface 332 may be angled at 45 degrees relative to the path of the light signals 102a, 102b. The optical coating on the surface 332 may transmit light having horizontal polarization, such as the light signal 102b. The optical coating on the surface 332 may reflect light having vertical polarization, such as the light signal 102a that has travelled through the waveplate 302.

Because the light signals 102b, 102c have horizontal polarization, and because the surface 331 and the surface 332 includes the surface optical coating that transmits light with horizontal polarization, the light signal 102b may pass through the surface 332 and the light signal 102c may pass through the surface 331.

The light signal 102a may be reflected from the transmission path of the light signal 102a by a surface 334. The surface 334 may be disposed at a forty-five degree angle relative to the transmission path of the light signal 102a. Alternatively or additionally, the surface 334 and the surface 332 may be arranged at any angle relative to the transmission path and/or may be parallel relative to one another.

Similarly, the light signal 102d may be reflected from the transmission path of the light signal 102d by a surface 333. The surface 333 may be disposed at a forty-five degree angle relative to the transmission path of the light signal 102d. Alternatively or additionally, the surface 333 and the surface 331 may be arranged at any angle relative to the transmission path and/or may be parallel relative to one another.

Because the light signals 102a, 102d have vertical polarization after passing through the waveplate 302, and because the surface 331 and the surface 332 include the surface optical coating that reflects light with vertical polarization, the light signals 102a, 102d may then be reflected by the surface 331 and the surface 332 in a direction parallel to the path of the light signals 102b, 102c, and/or parallel to the original path of the light signals 102a, 102d. In this way, for example, the polarization beam combiner 330 may combine the light signals 102a, 102b onto a common optical path and the light signals 102c, 102d onto a common optical path.

In other configurations, the optical coating on the surface 331 and/or the surface 332 may reflect light having vertical polarization and transmit light having horizontal polarization. In such configurations, the waveplate 302 may be positioned in the transmission path of the light signal 102b and/or the light signal 102c to polarize the light signals 102b, 102c to vertical polarization.

The polarization beam combiner 320 may combine light having different polarizations onto a common optical path. In some configurations, the polarization beam combiner 320 may combine optical signals having orthogonal polarizations with respect to one another, such as the light signals 102e, 102f and the light signals 102g, 102h. As illustrated, the polarization beam combiner 320 is configured to combine the light signals 102e, 102f to output the light signals 102e, 102f on a common optical path. Further, the polarization beam combiner 320 is configured to combine the light signals 102g, 102h to output the light signals 102g, 102h on a common optical path.

In more detail, and as illustrated, the polarization beam combiner 320 may include a surface 321 with an optical coating that reflects light with a first polarization and transmits light with a second polarization that is orthogonal to the first polarization. The surface 321 may be an angled surface. For example, the surface 321 may be angled at 45 degrees relative to the path of the light signals 102g, 102h. The optical coating on the surface 321 may transmit light having horizontal polarization, such as the light signal 102g. The optical coating on the surface 321 may reflect light having vertical polarization, such as the light signal 102h that has travelled through the waveplate 302.

Additionally or alternatively, the polarization beam combiner 320 may include a surface 322 with an optical coating that reflects light with a first polarization and transmits light with a second polarization that is orthogonal to the first polarization. The surface 322 may be an angled surface. For example, the surface 322 may be angled at 45 degrees relative to the path of the light signals 102e, 102f. The optical coating on the surface 322 may transmit light having horizontal polarization, such as the light signal 102f. The optical coating on the surface 322 may reflect light having vertical polarization, such as the light signal 102e that has travelled through the waveplate 302.

Because the light signals 102f, 102g have horizontal polarization, and because the surface 321 and the surface 322 include the surface optical coating that transmits light with horizontal polarization, the light signal 102f may pass through the surface 322 and the light signal 102g may pass through the surface 321.

The light signal 102e may be reflected from the transmission path of the light signal 102e by a surface 324. The surface 324 may be disposed at a forty-five degree angle relative to the transmission path of the light signal 102e. Alternatively or additionally, the surface 324 and the surface 322 may be arranged at any angle relative to the transmission path and/or may be parallel relative to one another.

Similarly, the light signal 102h may be reflected from the transmission path of the light signal 102h by a surface 323. The surface 323 may be disposed at a forty-five degree angle relative to the transmission path of the light signal 102h. Alternatively or additionally, the surface 323 and the surface 321 may be arranged at any angle relative to the transmission path and/or may be parallel relative to one another.

Because the light signals 102e, 102h have vertical polarization after passing through the waveplate 302, and because the surface 321 and the surface 322 include the surface optical coating that reflects light with vertical polarization, the light signals 102e, 102h may then be reflected by the surface 321 and the surface 322 in a direction parallel to the path of the light signals 102f, 102g, and/or parallel to the original path of the light signals 102e, 102h. In this way, for example, the polarization beam combiner 320 may combine the light signals 102e, 102f onto a common optical path and the light signals 102g, 102h onto a common optical path.

In other configurations, the optical coating on the surface 321 and/or the surface 322 may reflect light having vertical polarization and transmit light having horizontal polarization. In such configurations, the waveplate 302 may be positioned in the transmission path of the light signal 102f and/or the light signal 102g to polarize the light signals 102f, 102g to vertical polarization.

The light signals 102a, 102b and the light signals 102c, 102d may then pass through a polarizer 304 and another waveplate 306. Similarly, the light signals 102e, 102g and the light signals 102g, 102h may then pass through another polarizer 304 and yet another waveplate 306. The polarizers 304 may be 45 degree polarizers configured to rotate the polarization of light that passes therethrough by 45 degrees. Thus, the polarizers 304 may rotate the polarization of each of the light signals 102a-102h by 45 degrees. The waveplates 306 may be a half waveplates configured to rotate the polarization of light passing therethrough. In some embodiments, the waveplates 306 may be configured to rotate the polarization of light by 45 degrees or −45 degrees. In some embodiments, one or more of the waveplates 306 may be oriented at about −22.5 degrees or about 22.5 degrees. The polarizers 304 and the waveplates 306, in combination, may rotate polarization of each of the light signals 102a-102h to the same linear polarization. For example the polarizers 304 and the waveplates 306 may rotate the polarization of the light signals 102a-102h to the same horizontal or vertical polarization.

The light signals 102c, 102d and the light signals 102g, 102h may then pass through a combiner 340. Similarly, the light signals 102a, 102b and the light signals 102e, 102f may then pass through a combiner 360. The combiner 340 and/or the combiner 360 may be configured to combine the light signals 102a-102h travelling therethrough. For example, as illustrated, the combiner 340 is configured to combine the light signals 102g, 102h and the light signals 102c, 102d on a common optical path. In another example, as illustrated, the combiner 360 is configured to combine the light signals 102e, 102f and the light signals 102a, 102b on a common optical path. The combiner 340 and/or the combiner 360 may be low/high pass beam combiners including any suitable aspects described with respect to the low/high pass beam combiner 120 of FIG. 1.

As illustrated, the combiner 340 may include a surface 341 with an optical coating that reflects light in one wavelength band and transmits light in another wavelength band. The surface 341 may be an angled surface. For example, the surface 341 may be angled at 45 degrees relative to the path of the light signals 102c, 102d and/or the light signals 102g, 102h.

For example, the optical coating on the surface 341 may transmit light having a wavelength that is within a wavelength band that includes the wavelength $\lambda_3$ of the light signal 102c produced by the laser 105c and/or the wavelength $\lambda_4$ of the light signal 102d produced by the laser 105d. The optical coating on the surface 341 may reflect light having a wavelength that is within a wavelength band that includes the wavelength $\lambda_7$ of the light signal 102g produced by the laser 105g and/or the wavelength $\lambda_8$ of the light signal 102h produced by the laser 105h.

Because the surface 341 includes a surface optical coating that transmits light with a wavelength within a wavelength band that includes the wavelength $\lambda_3$ of the light signal 102c from the laser 105c and/or the wavelength $\lambda_4$ of the light signal 102d produced by the laser 105d, the light signals 102c, 102d may pass through the surface 341. The light signals 102g, 102h may be reflected from the transmission path of the light signals 102g, 102h by a surface 343. The surface 343 may be disposed at a forty-five degree angle relative to the transmission path of the light signals 102g, 102h. Alternatively or additionally, the surface 341 and the surface 343 may be arranged at any angle relative to the transmission path and/or may be parallel relative to one another. The light signals 102g, 102h may then be reflected by the surface 341 in a direction parallel to the path of the light signals 102c, 102d and/or parallel to the original path of the light signals 102g, 102h. In this way, for example, the combiner 340 may combine the light signals 102g, 102h and the light signals 102c, 102d onto a common optical path.

As illustrated, the combiner 360 may include a surface 361 with an optical coating that reflects light in one wavelength band and transmits light in another wavelength band. The surface 361 may be an angled surface. For example, the surface 361 may be angled at 45 degrees relative to the path of the light signals 102a, 102b and/or the light signals 102e, 102f.

For example, the optical coating on the surface 361 may transmit light having a wavelength that is within a wavelength band that includes the wavelength $\lambda_1$ of the light signal 102a produced by the laser 105a and/or the wavelength $\lambda_2$ of the light signal 102b produced by the laser 105b. The optical coating on the surface 361 may reflect light having a wavelength that is within a wavelength band that includes the wavelength $\lambda_5$ of the light signal 102e produced by the laser 105e and/or the wavelength $\lambda_6$ of the light signal 102f produced by the laser 105f.

Because the surface 361 includes a surface optical coating that transmits light with a wavelength within a wavelength band that includes the wavelength $\lambda_1$ of the light signal 102a from the laser 105a and/or the wavelength $\lambda_2$ of the light signal 102b produced by the laser 105b, the light signals 102a, 102b may pass through the surface 361. The light signals 102e, 102f may be reflected from the transmission path of the light signals 102e, 102f by a surface 363. The surface 363 may be disposed at a forty-five degree angle relative to the transmission path of the light signals 102e, 102f. Alternatively or additionally, the surface 361 and the surface 363 may be arranged at any angle relative to the transmission path and/or may be parallel relative to one another. The light signals 102e, 102f may then be reflected by the surface 361 in a direction parallel to the path of the light signals 102a, 102b and/or parallel to the original path of the light signals 102e, 102f. In this way, for example, the combiner 360 may combine the light signals 102a, 102b and the light signals 102e, 102f.

The light signals 102a, 102b, 102e, 102f and/or the light signals 102c, 102d, 102g, 102h may then pass through one or more of the isolator 125, the waveplate 126, the polarization beam combiner 130 and/or the lens 135 prior to being output to the optical fiber 140 for transmission via an optical communication network.

In some configurations, the isolator 125 may rotate the polarization of light signals 102a-102h travelling therethrough, for example, by 45 degrees. Thus, the light signals 102a-102h may leave the isolator 125 with 45 degree polarization and travel to the waveplate 126.

The waveplate 126 may rotate the 45 degree polarization of the light signals 102a-102h to vertical and/or horizontal polarizations. The waveplate 126 may include two portions, including a first portion in the optical path of the light signals 102a, 102b, 102e, 102f and a second portion in the optical path of the light signals 102c, 102d, 102g, 102h. The first portion and the second portion of the waveplate 126 may be configured to rotate the polarizations of the light signals 102a, 102b, 102e, 102f and the polarizations of the light signals 102c, 102d, 102g, 102h to polarizations that are orthogonal to one another. For example, the first portion in the optical path of the light signals 102a, 102b, 102e, 102f may be configured to rotate the polarizations of the light signals 102a, 102b, 102e, 102f to a vertical and/or 90 degree polarization, and the second portion in the optical path of the light signals 102c, 102d, 102g, 102h may be configured to rotate the polarizations of the light signals 102c, 102d, 102g, 102h to a horizontal and/or 0 degree polarization, or vice versa.

As illustrated, the polarization beam combiner 130 is configured to combine the light signals 102a, 102b, 102e, 102f with the light signals 102c, 102d, 102g, 102h to output the light signals 102a-102h through the lens 135 to the optical fiber 140. The polarization beam combiner 130 may combine optical signals having orthogonal polarizations with respect to one another, such as the light signals 102a, 102b, 102e, 102f and the light signals 102c, 102d, 102g, 102h that have travelled through the waveplate 126. As illustrated, the polarization beam combiner 130 is configured to combine the light signals 102a, 102b, 102e, 102f with the light signals 102c, 102d, 102g, 102h to output the light signals 102a-102h on a common optical path through the lens 135 to the optical fiber 140.

In more detail, and as illustrated, the polarization beam combiner 130 includes the surface 131 with the optical coating that reflects light with a first polarization and transmits light with a second polarization that is orthogonal to the first polarization. The optical coating on the surface 131 may transmit light having vertical polarization, such as the light signals 102a, 102b, 102e, 102f that have travelled through the waveplate 126. The optical coating on the surface 131 may reflect light having horizontal polarization, such as the light 102c, 102d, 102g, 102h that have travelled through the waveplate 126.

Because the light signals 102a, 102b, 102e, 102f have vertical polarization, and because the surface 131 includes the surface optical coating that transmits light with vertical polarization, the light signals 102a, 102b, 102e, 102f may pass through the surface 131. The light signals 102c, 102d, 102g, 102h may be reflected from the transmission path of the light signals 102c, 102d, 102g, 102h by a surface 133. Because the light signals 102c, 102d, 102g, 102h have horizontal polarization after passing through the waveplate 126, and because the surface 131 includes the surface optical coating that reflects light with horizontal polarization, the light signals 102c, 102d, 102g, 102h may then be reflected by the surface 131 in a direction parallel to the path of the light signals 102a, 102b, 102e, 102f, and/or parallel to the original path of the light signals 102c, 102d, 102g, 102h. In this way, for example, the polarization beam combiner 130 may combine the light signals 102a, 102b, 102e, 102f, and the light signals 102c, 102d, 102g, 102h onto a common optical path that passes through the lens 135 and into the optical fiber 140 for transmission via an optical communication network.

In other configurations, the optical coating on the surface 131 may reflect light having vertical polarization and transmit light having horizontal polarization. In such configurations, the waveplate 126 may be configured to polarize the light signals 102a, 102b, 102e, 102f, to horizontal polarization and polarize the light signals 102c, 102d, 102g, 102h to vertical polarization.

Figure 5A:
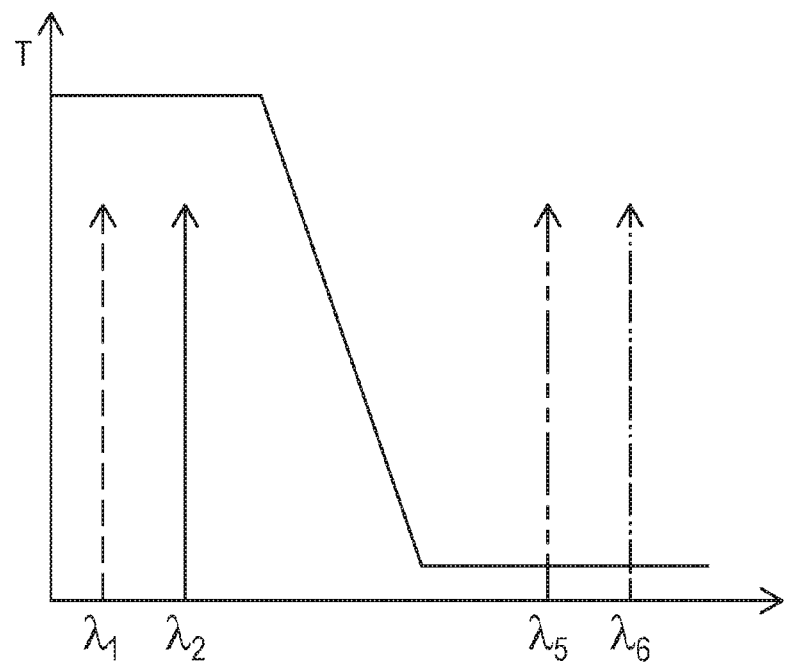
FIGS. 5A-5B illustrate graphs of transmittance of light versus wavelength for optical coatings.

FIG. 5A illustrates a graph of the transmittance T of light versus wavelength for an optical coating according to some embodiments described herein. As illustrated, the optical coating transmits substantially all or most of the light within a band that includes the wavelengths $\lambda_1$, $\lambda_2$ and substantially reflects all or most of the light within a band that includes the wavelengths $\lambda_5$, $\lambda_6$. The optical coating may be applied to the surface 361 of the combiner 360 as described above. In other configurations, the optical coating may be applied to other optical components described herein. The optical coating may include any type of coating that acts as a high pass filter or a low pass filter.

Figure 5B:
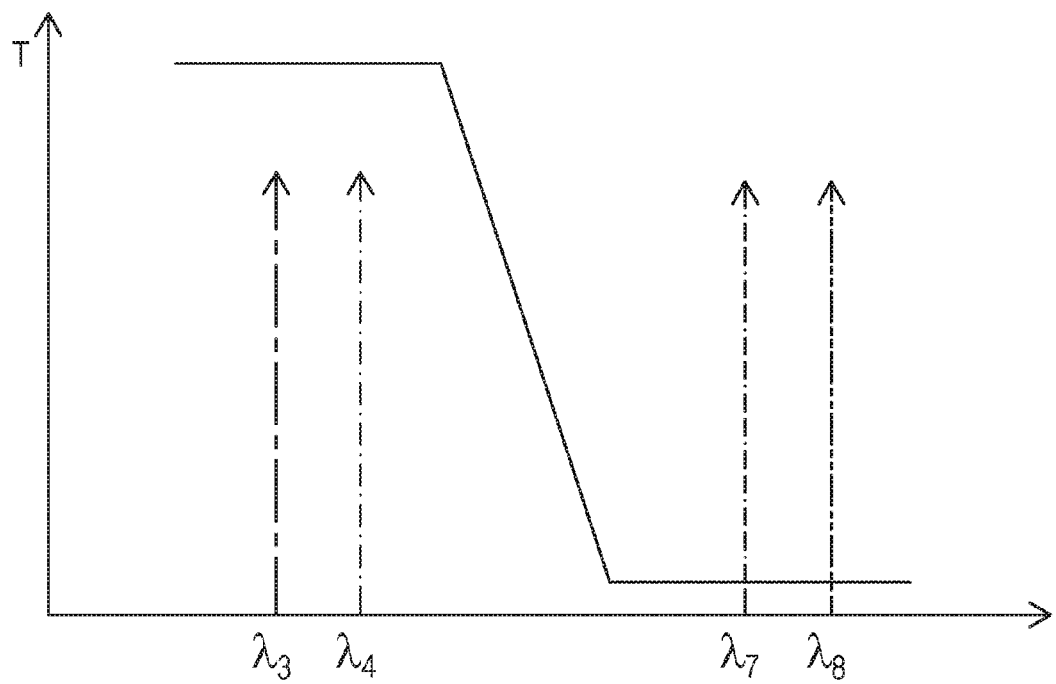

FIG. 5B illustrates a graph of the transmittance T of light versus wavelength for an optical coating according to some embodiments described herein. As illustrated, the optical coating transmits substantially all or most of the light within a band that includes the wavelengths $\lambda_3$, $\lambda_4$ and substantially reflects all or most of the light within a band that includes the wavelengths $\lambda_7$, $\lambda_8$. The optical coating may be applied to the surfaces 341 of the combiner 340 as described above. In other configurations, the optical coating may be applied to other optical components described herein. The optical coating may include any type of coating that acts as a high pass filter or a low pass filter.

Figure 6:
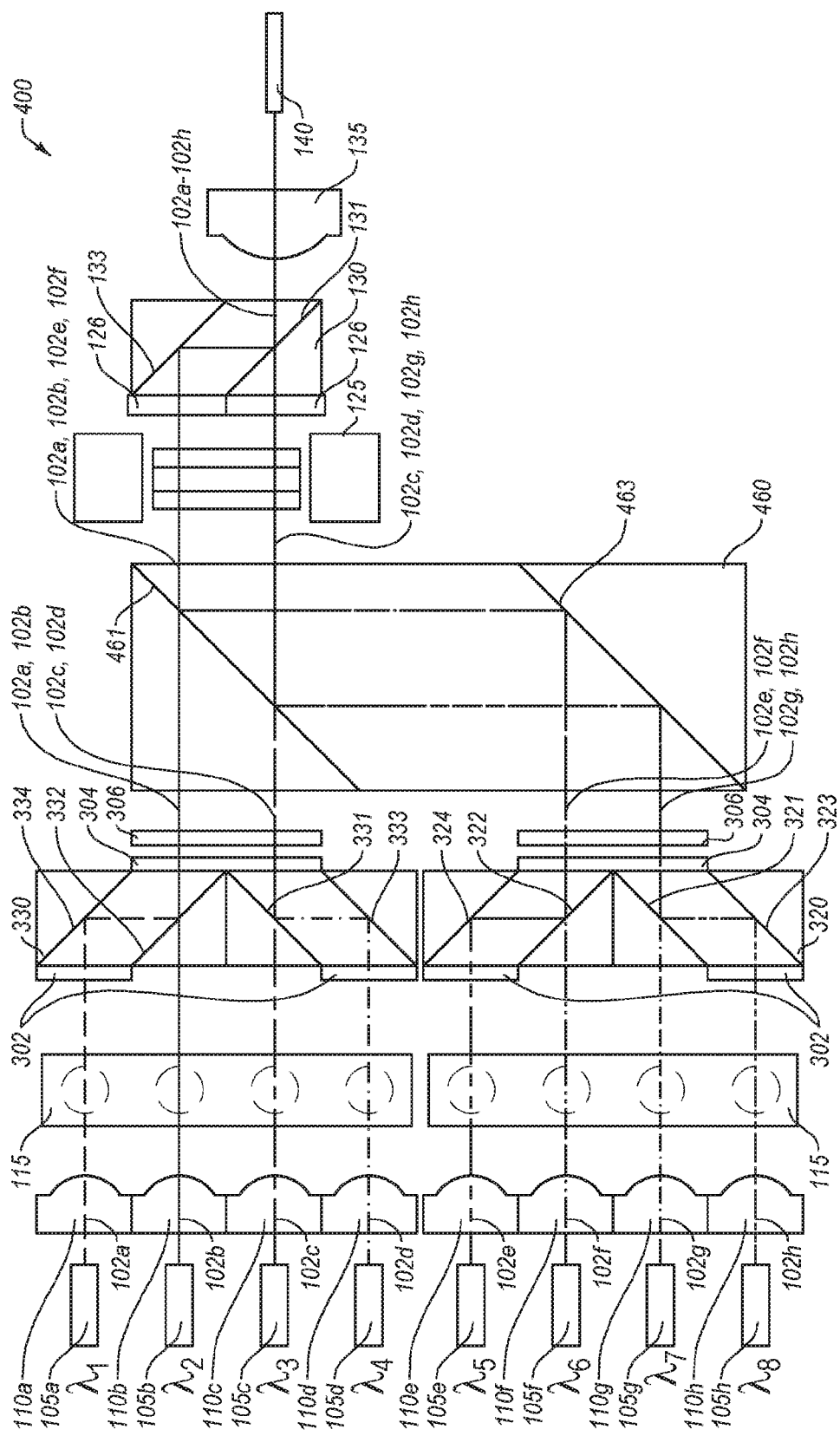
FIG. 6 illustrates another example of a multichannel transmitter optical subassembly.

FIG. 6 illustrates another example of a multichannel TOSA 400 according to some embodiments described herein. As illustrated, the TOSA 400 may include components similar or the same as those described with respect to the TOSA 300. Such components are indicated with the same component numbering used in FIG. 4 to describe the TOSA 300. As illustrated, a combiner 460 may be implemented in the TOSA 400 rather than the combiners 340 and 360 of the TOSA 300.

As illustrated, the combiner 460 is configured to combine the light signals 102a, 102b and the light signals 102e, 102f on a common optical path. Further, the combiner 460 is configured to combine the light signals 102c, 102d and the light signals 102g, 102h on another common optical path. As illustrated, the combiner 460 may include a surface 461 with an optical coating that reflects light in one wavelength band and transmits light in another wavelength band. The surface 461 may be an angled surface. For example, the surface 461 may be angled at 45 degrees relative to the path of the light signals 102a, 102b, the light signals 102c, 102d, the light signals 102e, 102f, and/or the light signals 102g, 102h.

For example, the optical coating on the surface 461 may transmit light having a wavelength that is within a wavelength band that includes the wavelengths $\lambda_1$, $\lambda_2$ of the light signals 102a, 102b and/or the wavelengths $\lambda_3$, $\lambda_4$ of the light signals 102c, 102d. The optical coating on the surface 461 may reflect light having a wavelength that is within a wavelength band that includes the wavelengths $\lambda_5$, $\lambda_6$ of the light signals 102e, 102f and/or the wavelengths $\lambda_7$, $\lambda_8$ of the light signals 102g, 102h.

Because the surface 461 includes a surface optical coating that transmits light with a wavelength within a wavelength band that includes the wavelengths $\lambda_1$, $\lambda_2$ of the light signals 102a,b and/or the wavelengths $\lambda_3$, $\lambda_4$ of the light signals 102c, 102d, the light signals 102a, 102b and the light signals 102c, 102d may pass through the surface 461. The light signals 102e, 102f may be reflected from the transmission path of the light signals 102g, 102h by a surface 463. Additionally or alternatively, the light signals 102g, 102h may be reflected from the transmission path of the light signals 102g, 102h by the surface 463.

The surface 463 may be disposed at a forty-five degree angle relative to the transmission path of the light signals 102e, 102f and/or the light signals 102g, 102h. Alternatively or additionally, the surface 461 and the surface 463 may be arranged at any angle relative to the transmission path and/or may be parallel relative to one another. The light signals 102e, 102f may then be reflected by the surface 461 in a direction parallel to the path of the light signals 102a, 102b and/or parallel to the original path of the light signals 102e, 102f. Additionally or alternatively, the light signals 102g, 102h may then be reflected by the surface 461 in a direction parallel to the path of the light signals 102c, 102d and/or parallel to the original path of the light signals 102g, 102h. In this way, for example, the combiner 460 may combine the light signals 102g, 102h and the light signals 102c, 102d on a common optical path and the light signals 102e, 102f, and the light signals 102a, 102b on another common optical path.

The light signals 102a, 102b, 102e, 102f and/or the light signals 102c, 102d, 102g, 102h may then pass through one or more of the isolator 125, the waveplate 126, the polarization beam combiner 130 and/or the lens 135 prior to being output to the optical fiber 140 for transmission via an optical communication network, as described above, for example, with respect to FIG. 4.

Figure 7:
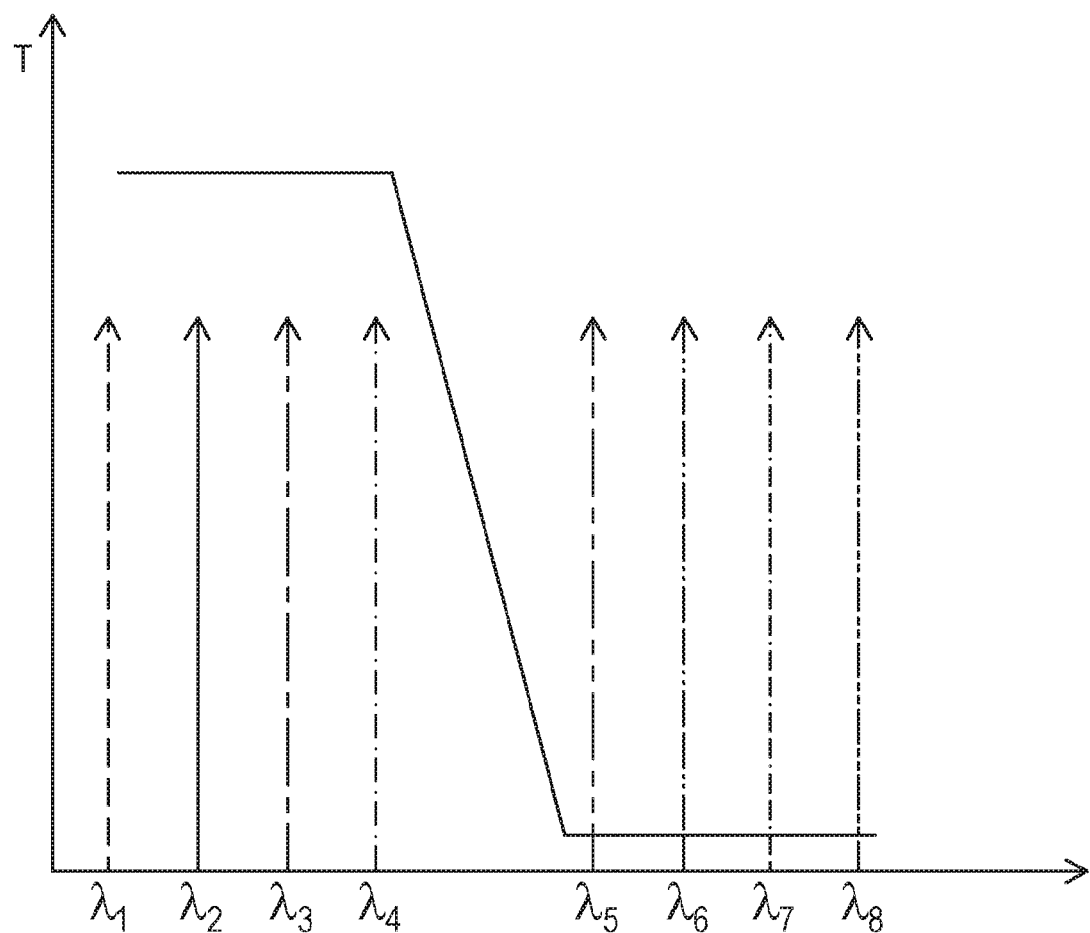
FIG. 7 illustrates a graph of transmittance of light versus wavelength for an optical coating.

FIG. 7 illustrates a graph of the transmittance T of light versus wavelength for an optical coating according to some embodiments described herein. As illustrated, the optical coating transmits substantially all or most of the light within a band that includes the wavelengths $\lambda_1$, $\lambda_2$, $\lambda_3$, $\lambda_4$ and substantially reflects all or most of the light within a band that includes the wavelengths $\lambda_5$, $\lambda_6$, $\lambda_7$, $\lambda_8$. The optical coating may be applied to the surface 461 of the combiner 460 as described above. In other configurations, the optical coating may be applied to other optical components described herein. The optical coating may include any type of coating that acts as a high pass filter or a low pass filter.

With combined reference to FIGS. 4 and 6, for example, the combiner 460 of the TOSA 400 simplifies the structure of the combiner 340 and the combiner 360 of the TOSA 300 into a single component. In some circumstances, this may simplify manufacturing of the TOSA 400 and/or decrease the cost of manufacturing the TOSA 400. Additionally or alternatively, such configurations may simplify alignment of the combiner 460 with respect to other components of the TOSA 400.

However, in some circumstances it may be more difficult to produce an optical coating for the surface 461 of the combiner 460, rather than the optical coatings for the surfaces 341 and 361 of the combiners 340, 360. For example, as illustrated in FIG. 7, the optical coating for the surface 461 may be configured to transmit four wavelengths $\lambda_1$, $\lambda_2$, $\lambda_3$, $\lambda_4$ of light and reflect four wavelengths $\lambda_5$, $\lambda_6$, $\lambda_7$, $\lambda_8$ of light. In contrast, as illustrated in FIGS. 5A and 5B, the optical coatings for the surfaces 341 and 361 may be configured to transmit only two wavelengths $\lambda_1$, $\lambda_2$ or $\lambda_3$, $\lambda_4$ and reflect two wavelengths $\lambda_5$, $\lambda_6$ or $\lambda_7$, $\lambda_8$. As such, the optical coating for the surface 461 may have a smaller difference in wavelength between the transmitted wavelengths $\lambda_1$, $\lambda_2$, $\lambda_3$, $\lambda_4$ and the reflected wavelengths $\lambda_5$, $\lambda_6$, $\lambda_7$, $\lambda_8$ when compared to the difference in wavelength between the transmitted wavelengths $\lambda_1$, $\lambda_2$ and the reflected wavelengths $\lambda_5$, $\lambda_6$ for the coating 361; or the transmitted wavelengths $\lambda_3$, $\lambda_4$ and the reflected wavelengths $\lambda_7$, $\lambda_8$ for the coating 341.

Selecting and/or manufacturing optical coatings with smaller difference in wavelength between the transmitted wavelengths and the reflected wavelengths may be more difficult and/or expensive compared to optical coatings that do not require such a small difference in wavelength between the transmitted wavelengths and the reflected wavelengths. Accordingly, in some circumstances, the configuration of the TOSA 300 may facilitate manufacturing of the TOSA 300 with less expensive and/or simpler optical coatings when compared to the TOSA 400.

Furthermore, the selection of transmission and reflection properties of optical coating may depend on the wavelengths of light emitted by the lasers. Accordingly, in some circumstances, aspects of the configuration of the TOSA 300 may facilitate the use of lasers with a greater variety wavelength configurations when compared to the TOSA 400 because different optical coatings may be used for different wavelengths of light emitted by the lasers.

In some embodiments, the wavelength arrangement of the various lasers 105a-105h may vary depending on the type of optical coating or optical coatings applied to the surfaces of the TOSA 300 and/or the TOSA 400. Similarly, in some embodiments, the type of optical coating may be selected based on the wavelengths of the various lasers 105a-105h.

As mentioned above, the configuration of the polarizers 304 and the waveplates 306 permits light signals travelling therethrough to be rotated to a common linear polarity, for example, in horizontal and/or vertical directions. Such configurations may permit simpler and/or lower cost optical coatings to be used in the TOSA 300 and/or the TOSA 400 relative to other assemblies. Specifically, forming optical coatings for low/high pass beam combiners may be more difficult and/or more expensive if the light signals travelling therethrough include different polarity. Accordingly, configuring the polarizers 304 and the waveplates 306 to rotate the polarization of the light signals travelling therethrough to a common linear polarity may permit simpler and/or less expensive optical coatings to be used in the TOSA 300 and/or the TOSA 400. This may in turn facilitate relatively simpler and/or lower costs production of the TOSA 300 and/or the TOSA 400 when compared to other optoelectronic assemblies.

The example embodiments disclosed herein may be embodied in other specific forms. The example embodiments disclosed herein are to be considered in all respects only as illustrative and not restrictive.

What is claimed is:

1. A multichannel transmitter optical subassembly comprising:
   a plurality of lasers configured to emit a different one of a plurality of light signals, each of the plurality of light signals having a wavelength within one of a plurality of wavelength bands; and
   a signal combiner disposed relative to the plurality of lasers to receive the plurality of light signals and that includes:
      at least one surface having an optical coating that reflects at least one of the light signals of the plurality of light signals and transmits at least one of the light signals of the plurality of light signals;
      a first polarization beam combiner optically coupled to the plurality of lasers;
      a low/high pass beam combiner optically coupled to an output of the first polarization beam combiner; and
      a second polarization beam combiner optically coupled to an output of the low/high pass beam combiner.

2. The multichannel transmitter optical subassembly according to claim 1, wherein the optical coating reflects at least two of the light signals of the plurality of light signals and transmits at least two of the light signals of the plurality of light signals based on wavelengths of the light signals.

3. The multichannel transmitter optical subassembly according to claim 1, wherein the optical coating reflects at least four of the light signals of the plurality of light signals and transmits at least four of the light signals of the plurality of light signals based on the wavelengths of the light signals.

4. The multichannel transmitter optical subassembly according to claim 1, wherein the plurality of lasers include a first laser that emits light at a first wavelength and a second laser that emits light at a second wavelength, wherein a difference between the first wavelength and the second wavelength is greater than or equal to 40 nm.

5. The multichannel transmitter optical subassembly according to claim 1, wherein the signal combiner comprises one or more mirrors and one or more filters.

6. A multichannel transmitter optical subassembly comprising:
   a first laser configured to emit a first light signal at a first wavelength;
   a second laser configured to emit a second light signal at a second wavelength;
   a third laser configured to emit a third light signal at a third wavelength;
   a fourth laser configured to emit a fourth light signal at a fourth wavelength;
   a fifth laser configured to emit a fifth light signal at a fifth wavelength;
   a sixth laser configured to emit a sixth light signal at a sixth wavelength;
   a seventh laser configured to emit a seventh light signal at a seventh wavelength;
   a eighth laser configured to emit a eighth light signal at a eighth wavelength;
   a first polarization beam combiner disposed relative to the first laser, the second laser, the third laser, the fourth laser, the fifth laser, the sixth laser, the seventh laser, and the eighth laser to receive the first light signal, the second light signal, the third light signal, the fourth light signal, the fifth light signal, the sixth light signal, the seventh light signal, and the eighth light signal, to combine the first light signal and the second light signal onto a first common optical path, to combine the third light signal and the fourth light signal onto a second common optical path, to combine the fifth light signal and the sixth light signal onto a third common optical path, and to combine the seventh light signal and the eighth light signal onto a fourth common optical path;
   a low/high pass beam combiner disposed relative to the first polarization beam combiner to receive the light signals on the first common optical path, the second common optical path, the third common optical path, and the fourth common optical path, to combine the light signals on the first common optical path and the third common optical path onto a fifth common optical path, and to combine the light signals on the second common optical path and the fourth common optical path onto a sixth common optical path; and
   a second polarization beam combiner disposed relative to the low/high pass beam combiner to receive light signals on the fifth common optical path and the sixth common optical path and to combine the light signals on the fifth common optical path and the sixth common optical path onto a seventh common optical path.

7. The multichannel transmitter optical subassembly according to claim 6, wherein the low/high pass beam combiner comprises one or more mirrors and one or more filters.

8. The multichannel transmitter optical subassembly according to claim 6, further comprising a beam splitter positioned between the first polarization beam combiner and at least one of the first laser, the second laser, the third laser and the fourth laser.

9. The multichannel transmitter optical subassembly according to claim 8, further comprising a lens positioned between the beam splitter and at least one of the first laser, the second laser, the third laser and the fourth laser.

10. The multichannel transmitter optical subassembly according to claim 6, wherein each of the first laser, the second laser, the third laser and the fourth laser is optically coupled to a single optical fiber.

11. The multichannel transmitter optical subassembly according to claim 10, further comprising:
   a half waveplate positioned in an optical path of the first light signal, the fourth light signal, the fifth light signal, and the eighth light signal between the first polarization beam combiner and each of the first laser, the fourth laser, the fifth laser, and the eighth laser and configured to rotate the first light signal to have a first polarization orthogonal to a second polarization of the second light signal, to rotate the fourth light signal to have a fourth polarization orthogonal to a third polarization of the third light signal, to rotate the fifth light signal to have a fifth polarization orthogonal to a sixth polarization of the sixth light signal, and to rotate the eighth light signal to have an eighth polarization orthogonal to a seventh polarization of the seventh light signal; and
   wherein the first polarization beam combiner is positioned in an optical path of the first light signal, the second light signal, the third light signal, the fourth light signal, the fifth light signal, the sixth light signal, the seventh light signal, and the eighth light signal between the low/high pass beam combiner and the half waveplate, the first polarization beam combiner including a first surface with a first optical coating, the first optical coating providing a first transmittance to the second light signal with the second polarization, and a first reflectance to the first light signal with the first polarization, a second surface with a second optical coating, the second optical coating providing a second transmittance to the third light signal with the third polarization, and a second reflectance to the fourth light signal with the fourth polarization, a third surface with a third optical coating, the third optical coating providing a third transmittance to the sixth light signal with the sixth polarization, and a third reflectance to the fifth light signal with the fifth polarization, a fourth surface with a fourth optical coating, the fourth optical coating providing a fourth transmittance to the seventh light signal with the seventh polarization, and a fourth reflectance to the eighth light signal with the eighth polarization.

12. The multichannel transmitter optical subassembly according to claim 11, further comprising an isolator positioned between the low/high pass beam combiner and the second polarization beam combiner.

13. The multichannel transmitter optical subassembly according to claim 12, further comprising a lens positioned between the second polarization beam combiner and the optical fiber.

14. A multichannel transmitter optical subassembly comprising:
   a first laser configured to emit a first light signal at a first wavelength;
   a second laser configured to emit a second light signal at a second wavelength;
   a third laser configured to emit a third light signal at a third wavelength;
   a fourth laser configured to emit a fourth light signal at a fourth wavelength;
   a fifth laser configured to emit a fifth light signal at a fifth wavelength;
   a sixth laser configured to emit a sixth light signal at a sixth wavelength;
   a seventh laser configured to emit a seventh light signal at a seventh wavelength;
   a eighth laser configured to emit an eighth light signal at an eighth wavelength;
   a first half waveplate positioned in an optical path of the first light signal and a second half waveplate positioned in an optical path of the fourth light signal, the second light signal and the third light signal including a first polarization and the first half waveplate configured to rotate the first light signal to a second polarization that is orthogonal to the first polarization and the second half waveplate configured to rotate the fourth light signal to the second polarization;
   a first polarization beam combiner positioned in an optical path of the first light signal, the second light signal, the third light signal, and the fourth light signal, the first polarization beam combiner including a first surface with a first optical coating and a second surface with a second optical coating, the first optical coating providing a transmittance to the second light signal with the first polarization, and a reflectance to the first light signal with the second polarization, the second optical coating providing a transmittance to the third light signal with the first polarization, and a reflectance to the fourth light signal with the second polarization;
   a third half waveplate positioned in an optical path of the fifth light signal and a fourth half waveplate positioned in an optical path of the eighth light signal, the sixth light signal and the seventh light signal including a third polarization and the third half waveplate configured to rotate the fifth light signal to a fourth polarization that is orthogonal to the third polarization and the fourth half waveplate configured to rotate the eighth light signal to the fourth polarization;
   a second polarization beam combiner positioned in an optical path of the fifth light signal, the sixth light signal, the seventh light signal, and the eighth light signal, the second polarization beam combiner including a third surface with a third optical coating and a fourth surface with a fourth optical coating, the third optical coating providing a transmittance to the sixth light signal with the third polarization, and a reflectance to the fifth light signal with the fourth polarization, the second optical coating providing a transmittance to the seventh light signal with the third polarization, and a reflectance to the eighth light signal with the fourth polarization;
   an optical fiber;
   a fifth half waveplate positioned in an optical path of the first light signal, the second light signal, the third light signal, the fourth light signal, the fifth light signal, the sixth light signal, the seventh light signal, and the eighth light signal between the optical fiber and each of the first laser, the second laser, the third laser, the fourth laser, the fifth laser, the sixth laser, the seventh laser, and the eighth laser and configured to rotate each of the first light signal, the second light signal, the fifth light signal and the sixth light signal to a fifth polarization and each of the third light signal, the fourth light signal, the seventh light signal and the eighth light signal to a sixth polarization that is orthogonal to the fifth polarization;
   a third polarization beam combiner positioned in an optical path of the first light signal, the second light signal, the third light signal, the fourth light signal the fifth light signal, the sixth light signal, the seventh light signal, and the eighth light signal between the optical fiber and the fifth half waveplate, the third polarization beam combiner including a seventh surface with a seventh optical coating, the seventh optical coating providing a transmittance to the third light signal, the fourth light signal, the seventh light signal, and the eighth light signal each with the sixth polarization, and a reflectance to the first light signal, the second light signal, the fifth light signal and the sixth light signal each with the fifth polarization; and a first signal combiner positioned in an optical path of the first light signal, the second light signal, the third light signal, the fourth light signal the fifth light signal, the sixth light signal, the seventh light signal, and the eighth light signal, between the first and second polarization beam combiners and the third polarization beam combiner, configured to combine the first light signal, the second light signal, the third light signal, the fourth light signal the fifth light signal, the sixth light signal, the seventh light signal, and the eighth light signal based on the first wavelength, the second wavelength, the third wavelength, the fourth wavelength, the fifth wavelength, the sixth wavelength, the seventh wavelength, and the eighth wavelength.

15. The multichannel transmitter optical subassembly according to claim 14, wherein the first signal combiner further comprises:
a second signal combiner optically coupled to the third laser, the fourth laser, the seventh laser and the eighth laser, the second signal combiner including a fifth surface with a fifth optical coating, the fifth optical coating providing a transmittance in a first wavelength band that includes the third wavelength and the fourth wavelength, and a reflectance in a second wavelength band that includes the seventh wavelength and the eighth wavelength; and
a third signal combiner optically coupled to the first laser, the second laser, the fifth laser, and the sixth laser, the third signal combiner including a sixth surface with a sixth optical coating, the sixth optical coating providing a transmittance in a third wavelength band that includes the first wavelength and the second wavelength, and a reflectance in a fourth wavelength band that includes the fifth wavelength and the sixth wavelength.

16. The multichannel transmitter optical subassembly according to claim 14, wherein the first signal combiner is optically coupled to the first laser, the second laser, the third laser, the fourth laser, the fifth laser, the sixth laser, the seventh laser and the eighth laser, the first signal combiner including a fifth surface including a fifth optical coating and a sixth surface including a sixth optical coating, the fifth optical coating providing a transmittance in a first wavelength band that includes the third wavelength and the fourth wavelength, and a reflectance in a second wavelength band that includes the seventh wavelength and the eighth wavelength, the sixth optical coating providing a transmittance in a third wavelength band that includes the first wavelength and the second wavelength, and a reflectance in a fourth wavelength band that includes the fifth wavelength and the sixth wavelength.

17. The multichannel transmitter optical subassembly of claim 6 wherein the low/high pass beam combiner further comprises a first surface with a first optical coating, the first optical coating providing a transmittance in a first wavelength band that includes the first wavelength, the second wavelength, the third wavelength, and the fourth wavelength and a reflectance in a second wavelength band that includes the fifth wavelength, the sixth wavelength, the seventh wavelength, and the eighth wavelength.

18. The multichannel transmitter optical subassembly of claim 6 wherein the low/high pass beam combiner further comprises:
a first surface with a first optical coating, the first optical coating providing a transmittance in a first wavelength band that includes the first wavelength and the second wavelength, and a reflectance in a second wavelength band that includes the fifth wavelength and the sixth wavelength; and
a second surface with a second optical coating, the second optical coating providing a transmittance in a third wavelength band that includes the third wavelength, and the fourth wavelength, and a reflectance in a fourth wavelength band that includes the seventh wavelength, and the eighth wavelength.

19. The multichannel transmitter optical subassembly according to claim 14, wherein the first signal combiner is optically coupled to the first laser, the second laser, the third laser, the fourth laser, the fifth laser, the sixth laser, the seventh laser and the eighth laser, the first signal combiner including a fifth surface including a fifth optical coating the fifth optical coating providing a transmittance in a first wavelength band that includes the first wavelength, the second wavelength, the third wavelength and the fourth wavelength, and a reflectance in a second wavelength band that includes the fifth wavelength, the sixth wavelength, the seventh wavelength and the eighth wavelength.

20. The multichannel transmitter optical subassembly according to claim 14, wherein the first signal combiner is optically coupled to the first laser, the second laser, the third laser, the fourth laser, the fifth laser, the sixth laser, the seventh laser and the eighth laser, the first signal combiner including
a fifth surface including a fifth optical coating the fifth optical coating providing a transmittance in a first wavelength band that includes first wavelength and the second wavelength, and a reflectance in a second wavelength band that includes the fifth wavelength and the sixth wavelength; and
a sixth surface with a sixth optical coating, the sixth optical coating providing a transmittance in a third wavelength band that includes the third wavelength, and the fourth wavelength, and a reflectance in a fourth wavelength band that includes the seventh wavelength, and the eighth wavelength.

\* \* \* \* \*